Dec. 19, 1944.   C. L. EKSERGIAN   2,365,180
BRAKE CONTROL MEANS
Filed Oct. 18, 1941   3 Sheets-Sheet 2
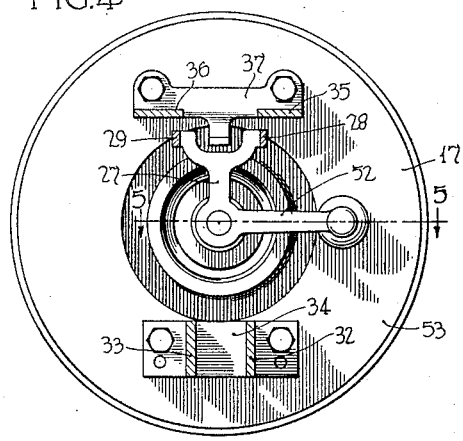
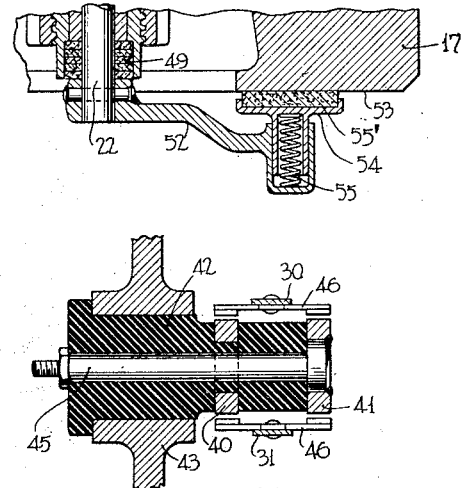
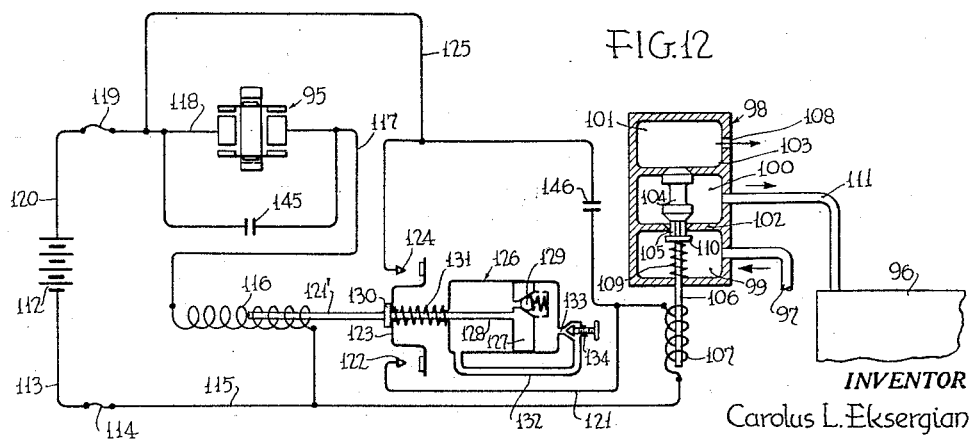
INVENTOR
Carolus L. Eksergian
BY John P. Jacobs
ATTORNEY Dec. 19, 1944. C. L. EKSERGIAN 2,365,180
BRAKE CONTROL MEANS
Filed Oct. 18, 1941 3 Sheets-Sheet 3
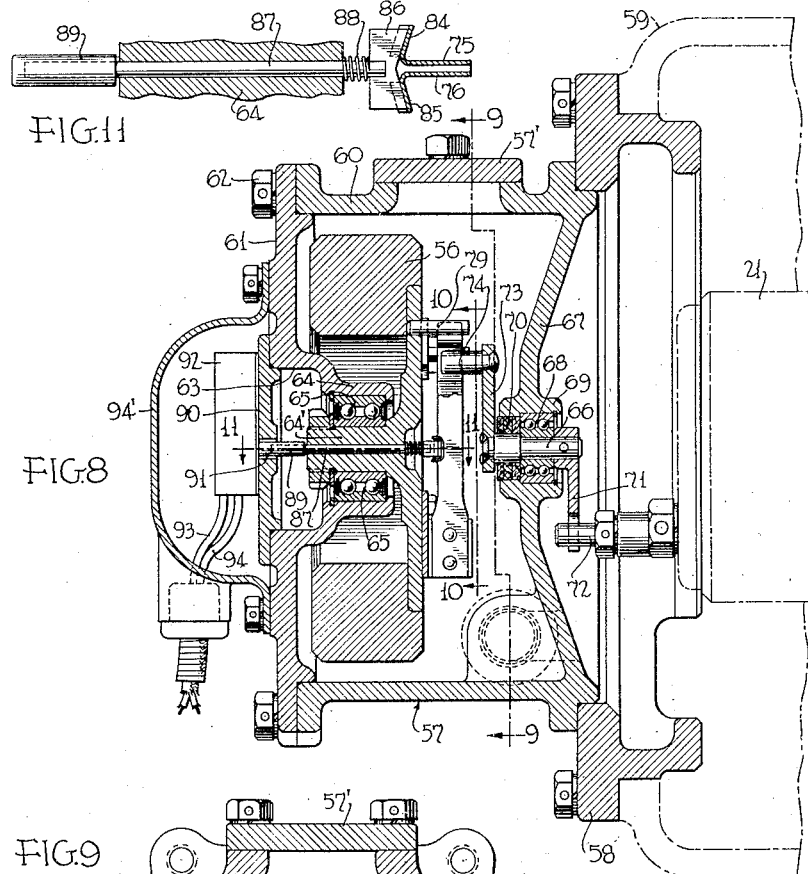
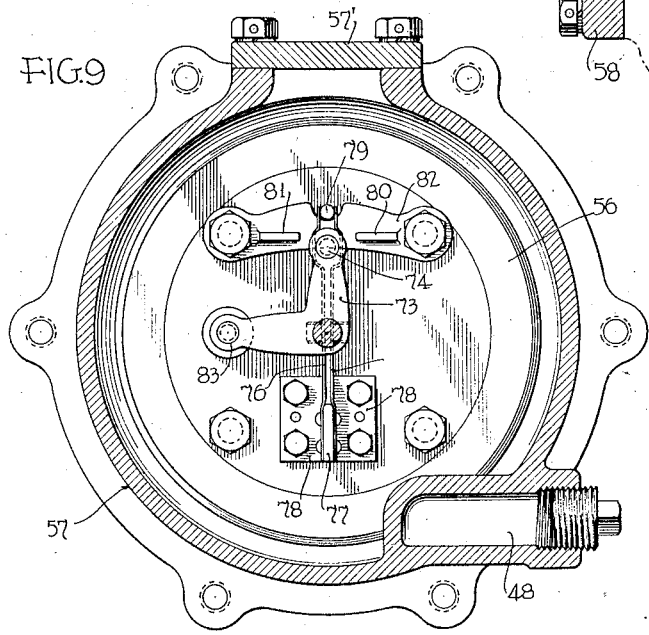
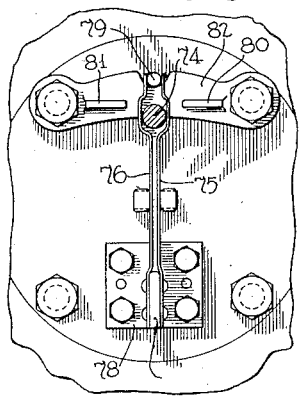
INVENTOR
Carolus L. Eksergian.
BY John P. Tacby
ATTORNEY Patented Dec. 19, 1944

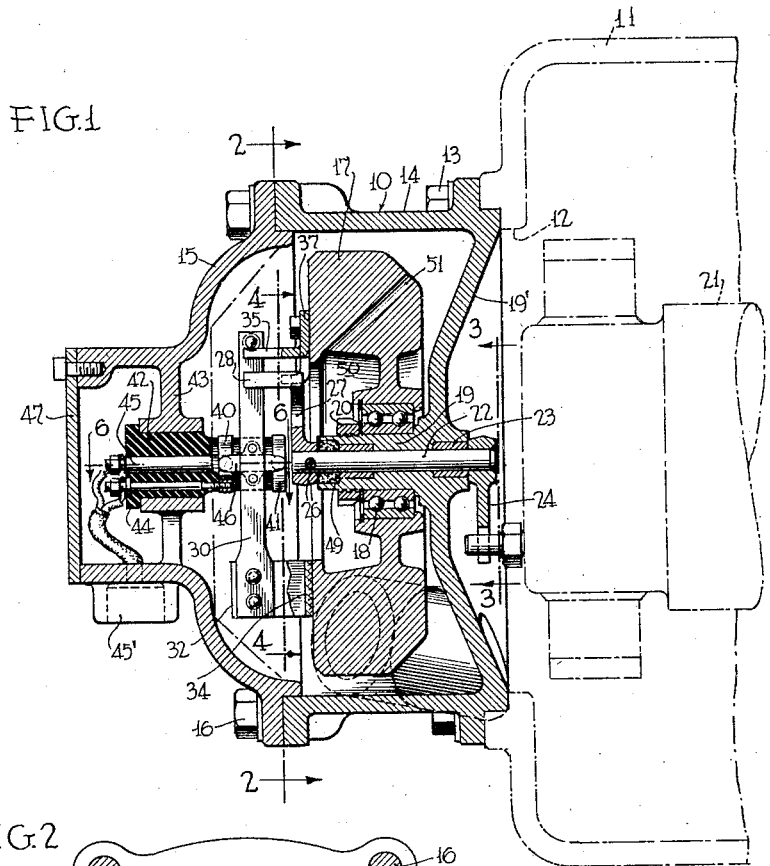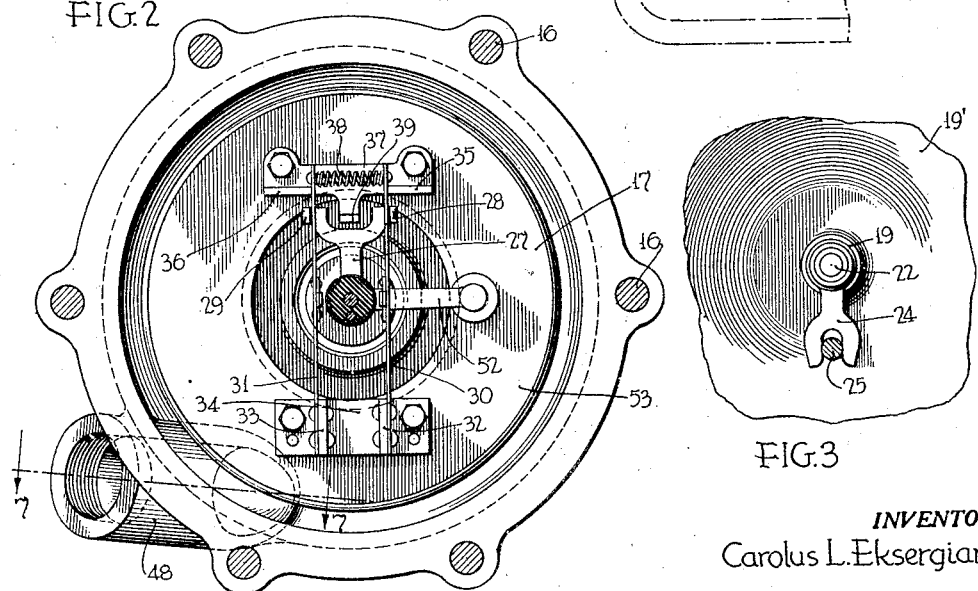

2,365,180

UNITED STATES PATENT OFFICE 2,365,180

BRAKE CONTROL MEANS

Carolus L. Eksergian, Detroit, Mich., assignor to Budd Wheel Company, Philadelphia, Pa., a corporation of Pennsylvania Application October 18, 1941, Serial No. 415,518

16 Claims. (Cl. 200—52)

The invention relates to a wheel protector for railway wheels and particularly to such a device adapted to prevent sliding of the wheels on the tracks due to brake application.

In modern high speed trains, adequate braking becomes highly important to enable the train to be brought to a stop within reasonable distances. It is of no avail, however, to exert powerful braking on the wheels unless the wheels are maintained during the braking in rolling contact with the rails. If the braking force overcomes the rail adhesion the wheel will slip on the rail and if the braking force is not reduced it will rapidly decelerate to a "locked" state in which it slides on the rail. Such sliding on the rail is objectionable for two reasons; first, it wears "flats" on the slid wheel necessitating the removal of the wheel and the grinding and truing thereof, and second, the sliding wheel has less retarding effect on the train than a braked rolling wheel, since it is well known that the coefficient of sliding friction is less than the coefficient of rolling friction.

It is an object of the invention to overcome these difficulties and insure that the braking force never, during running, is allowed to remain on long enough to permit a slipping wheel to reach the sliding stage, but to maintain the braking at a high efficiency by promptly again applying the braking force to the wheel as soon as may be after the wheel has returned to normal speed following slipping thereof.

It is further an object of my invention to provide an instrumentality of this class which is simple in construction, efficient in operation, assured of a long life in use, and one which can be readily applied to the vehicle and manufactured at low cost.

In practice, the device may consist of a suitable valve mechanism inserted in the usual operator-controlled pressure line to the brake cylinder and an automatic control for the operation of said valve to cut off and release pressure to and from the brake cylinder, said control including an inertia governor responsive to excessive acceleration and deceleration, such as takes place on wheel slip, of the wheel being braked. Preferably, one such control device is inserted in each brake cylinder pressure line so that each wheel or at least each axle of the vehicle is protected by a separate device against sliding. With the usual axle having two wheels fixed thereto, it is desirable to associate a control device with each axle.

Other and further objects and advantages and the manner in which they are attained will become apparent from the following detailed description when read in connection with the drawings forming a part of this specification.

In the drawings:

Fig. 1 is a vertical axial sectional view through a preferred form of inertia governor device shown applied to the end of a vehicle axle.

Fig. 2 is a section at right angles to the section of Fig. 1 taken on the line 2—2 of Fig. 1.

Fig. 3 is a fragmentary sectional view taken on the line 3—3 of Fig. 1.

Fig. 4 is a sectional view, the section being taken on the line 4—4 of Fig. 1.

Fig. 5 is a fragmentary sectional view on an enlarged scale taken on the line 5—5 of Fig. 4.

Fig. 6 is a fragmentary sectional view on an enlarged scale taken on the line 6—6 of Fig. 1.

Fig. 7 is a fragmentary sectional view taken on the line 7—7 of Fig. 2.

Fig. 8 is a sectional view similar to Fig. 1, of a modified form of inertia governor device.

Fig. 9 is a sectional view taken on the line 9—9 of Fig. 8.

Fig. 10 is a fragmentary sectional view taken on the line 10—10 of Fig. 8.

Fig. 11 is an enlarged fragmentary sectional view taken on the line 11—11 of Fig. 8.

Fig. 12 is a diagrammatic view showing the electro-pneumatic system which may be controlled by the governor devices of either Figs. 1 or 8.

In the preferred form of inertia governor device of Figs. 1 to 7, inclusive, the inertia governor device together with the electric switch controlled thereby is housed in a unitary casing 10 which may take the place of the usual cover on the end of the axle bearing box 11 and be secured directly to the margin of the opening 12 in a manner to form a tight closure therefor, by the bolts 13.

The casing, for convenience of assembly and disassembly, may comprise two sections 14 and 15 forming a tight joint with each other and secured together by bolts 16. The rotary inertia member 17 is mounted through an anti-friction bearing 18 upon an outwardly projecting boss 19 extending from the inner wall 19' of the casing 10. The outer race of the bearing 18 is secured to the hub of the inertia member between a shoulder at the inner end of the hub and a split ring engaging a groove adjacent the outer end, while the inner race is secured between a shoulder on the inner end of the boss and a nut 20 screwed onto its screw-threaded outer end. The inertia member 17 is arranged to be driven from the axle 21 of the vehicle through a connection which is readily engaged when the casing 10 is assembled, by axial movement, with the axle box 11 and axle 21, and in order to enable the inertia member, at times, to overrun or lag behind the axle, the driving connection includes resilient means.

To enable the resilient drive to be arranged at the outer face of the inertia member where it is readily accessible by removing the outer section 15 of the casing a crank shaft 22 is passed through a bore extending concentric with the axle through the inner wall 19' of the casing and the boss 19 projecting therefrom, this shaft being rotatable in bearing bushings as 23 arranged adjacent the opposite ends thereof. At its inner end the shaft has secured to it an arm 24 which is bifurcated to straddle a stud 25 secured in eccentric relation to the end of the axle. At its outer end it has secured to it, as by a pin 26, an arm 27 which is also bifurcated at its outer end and provided with axially extending driving extensions 28 and 29 one on each of the furcations and spaced apart some distance, see Fig. 2. The extensions 28 and 29 straddle a pair of spaced leaf springs 30 and 31 extending transaxially and arranged along chords approximating the diameter and at equal distances from the opposite sides of the axis of the inertia member.

These springs are secured as by rivets at one of their adjacent ends to axial extensions 32 and 33, respectively, of a bracket 34 bolted to the outer face of the inertia member. Adjacent their opposite free ends they extend close to the adjacent faces of the driving extensions 28 and 29, respectively, and at these free ends they bear against axially extending abutments 35 and 36, respectively, projecting from a bracket 37 bolted to the outer face of the inertia member 17.

The springs are preferably placed under a certain amount of initial tension and are held against the respective abutments 35 and 36 under this initial tension. If desired, the initial tension of the springs 30 and 31 may be augmented by a coil spring 38 arranged between their free ends and adding its tension to that of the springs 30 and 31 to hold them against the abutments 35 and 36, respectively, as is more fully described in the copending application of Eksergian and Coombes, Serial No. 485,788, filed May 5, 1943. As clearly appears in Fig. 2 the brackets 34 and 37 and springs 30 and 31 are arranged in balanced relation about the axis of the inertia member so as to maintain it in balance.

From the foregoing, it will be seen that the inertia member is constantly driven from the axle through a yielding drive, in one direction of movement through one spring, as 30, and in the other direction of movement through the other spring 31. At normal rates of acceleration and deceleration, say not exceeding 5 miles per hour per second, the tension of the springs is sufficient to maintain the springs against the abutments 35 and 36 and the drive is affected with very little deflection of the springs, since the engagement of the driving extensions 28 and 29 with the springs is very close to the abutments. When the acceleration or deceleration of the axle rises above the normal, say to 10 miles per hour per second, the initial tension of the spring then doing the driving and, if the additional coil spring 38 is used, the tension of this spring also, is overcome and the spring is moved against a fixed abutment 39 projecting axially from bracket 37 between the springs 30 and 31. When such movement occurs a switch in an electric circuit may be closed and held closed as long as such excessive acceleration or deceleration persists. When the acceleration or deceleration again reaches the normal rate, i. e. the rate of travel of the vehicle, the tension of the spring under compression restores the parts to the position shown in Fig. 2.

The switch controlled by the inertia member may comprise a spaced pair of collector rings 40 and 41 mounted on a plug 42 of insulating material, which plug has its outer end rigidly mounted in the hub of a spider 43 supported from the wall of the outer casing section 15. The inner reduced end of this plug extends between the springs 30 and 31 substantially in axial alignment with the axis of the inertia member and carries the collector rings axially on opposite sides of said springs. The collector rings are connected to binding posts 44 and 45 which in turn are connected to wires in the circuit to be controlled by the switch which wires may be extended through the wall of the casing to a usual form of attachment socket indicated at 45'. Opposite the rings 40 and 41 each of the springs 30 and 31 carries a bridging contact 46 secured to the spring intermediate its ends, suitably insulated therefrom and carrying a pair of contact buttons, one at each end thereof, but normally spaced from the rings. When, due to abnormal acceleration or deceleration, one of the springs is deflected to engage the stop abutment 39, the bridging member contact buttons of said spring are brought into engagement with the collector rings to close the switch, and the switch will be held closed until the parts return to the position of Fig. 2, following a return to normal acceleration or deceleration.

To permit examination of the switch and drive at any time, a removable cover 47 is provided to close the outer reduced end of the casing 10. When the cover is removed, direct access is had to the binding posts and to the inside of the spider 43 through the openings between the spokes thereof. To permit filling of the axle box with oil to the required level to oil the bearings of the axle, a charging port 48 may be provided in the casing part 14, see Figs. 1, 2, 7, this port opening at its inner end into the bearing box 11 and at its outer end being provided with a screw thread to receive a closing plug, not shown. The bottom of the outer end of this port is preferably arranged at the level at which it is desired to hold the oil in the bearing box. By placing this port in the casing, it is unnecessary to provide a separate filler port in the axle box.

To prevent leakage of oil from the axle box into the casing 10 a suitable packing, as 49, is provided between the shaft 22 and the boss 19. Even if there should be slight leakage of oil past the packing, it would be thrown out centrifugally into an inwardly facing annular channel 50 having an inclined bottom and discharged through an opening 51 extending from the lowest portion of said channel to the periphery of the inertia member, from whence it would collect by gravity at the bottom of the casing.

To prevent undesired surges of the inertia member, a damper is preferably associated therewith. Such damper may comprise an arm 52 extending at substantially right angles from the arm 27 and preferably integral therewith, this arm 52 having at its free end a socket arranged at right angles to the flat outer face 53 of the inertia member and carrying for telescoping movement with said socket a brake shoe 54 carrying on its face engaging the face 53 a suitable friction material 55'. The shoe is pressed into braking engagement by a spring 55 housed within the telescoping parts of the arm and shoe.

The operation of the inertia controlled switch shown in Figs. 1 to 7, inclusive will now be described. While the axle is rotating, the inertia member 17 is driven through the shaft 22 and one of the axially extending driving arms 28 or 29, engaging the spring 30 or 31 adjacent thereto, one or the other of these arms and their cooperating springs doing the driving dependent upon the direction of rotation of the axle. While the wheels and axle are decelerating at a normal rate during braking, the initial tension of the springs 30 or 31 is sufficient to prevent relative rotary movement between the inertia member and the shaft 22 rotating at the speed of the axle sufficient to overcome either of the springs and close the switch by engagement of the bridging contact carried by a spring with the collector rings 40, 41. Undesired surges of the inertia member are prevented by the damping brake 52 to 55. If, however, a wheel begins to slip, the axle at once begins to decelerate very rapidly and almost immediately after the start of slipping attains a deceleration, say double the normal deceleration. The inertia member under this abnormal deceleration overcomes the spring opposite the driving spring, overrunning the axle speed, and in overcoming the resistance of the spring, moving its associated bridging contact into contact with the collector rings to close the switch. The switch will be held closed until the deceleration again drops to a rate near the normal rate, say below 10 miles per hour per second, when the spring tension will return the parts to the position in Fig. 2 with the switch open.

With the arrangement of switch members shown little wear of the switch contacts results because they are in engagement only at intervals of wheel slip. At the same time, during such intervals the contacts are engaged with the collector rings and wipe over them to maintain them clean and free from accumulation of dirt or rust. Thus they are always maintained in good condition not withstanding the fact that they engage only in case of wheel slipping.

According to the modification shown in Figs. 8 to 11, inclusive, the inertia member 56 is mounted within a casing 57, which in this case is secured through an adaptor 58 to the axle box 59 in a manner substantially similar to the preferred form. In this form the casing consists of two sections 60 and 61, the section 60 constituting the main body of the casing and the section 61 constituting an outer cover, bolted at 62 to the section 60. At the center of this cover is provided an axial opening 63 from the margins of which extends inwardly a bearing sleeve 64 integral with the cover, an inner bearing seat on this sleeve cooperates with an outer bearing seat on the hub 64' of the inertia member 56 to rotatably support said member through the anti-friction bearings 65.

The drive between the axle and the inertia member is very similar to the drive in the preferred form. It comprises a crank shaft 66 mounted concentric with the axle in a boss 69 in the inner wall 67 of the casing 57 through the anti-friction bearing 68. Leakage of oil past the bearing is prevented by the packing 70. An arm 71 on the shaft 66 connects with a stud 72 projecting from the end of the axle as in the preferred form. Another arm 73 is rigidly secured to the end of the shaft 66 within the casing which arm is provided at its free end with an axially projecting driving stud 74. The driving stud 74 projects between the free ends of two leaf springs 75 and 76 arranged diametrically of the axially inner face of the inertia member and secured at one of their adjacent ends on the opposite sides of an axially extending arm 77, as by rivets. Arm 77 is integral with the base 78 of a bracket bolted to the inner radially extending face of the inertia member. The springs are initially tensioned as in the preferred form, and their free ends rest in normal position against the opposite sides of a pin 79 projecting axially inwardly from the inner face of the inertia member. A pair of spaced axially extending abutments 80 and 81 integral with a base plate 82 bolted to the inner face of the inertia member limit the overrunning and lagging movement of the inertia member by engagement with one or the other of the springs 75 and 76 in a region adjacent their engagement with the driving stud 74. A damping device 83 entirely similar to that shown in the preferred form may be provided.

To close a switch when the inertia member overruns or lags behind the axle, the springs 75 and 76 are provided in line with the axis of the inertia member and axle with lateral channel section extensions, see Fig. 11, designated, respectively, 84 and 85. These extensions are inclined to provide cam faces which cam faces are normally engaged by corresponding faces on the widened head 86 carried by a rod 87 slidably mounted in a bore provided centrally of the hub 64 of the inertia member. A light spring 88 surrounding the rod and bearing at its opposite ends against the inner face of the inertia member and against the head 87, normally holds the cam faces in engagement as shown in Fig. 11. An enlarged outer end 89 on the rod limits its inward movement under the action of the spring.

The central opening 63 of the casing portion 61 is closed by a removable cover 90 having a central opening 91 into which the outer enlarged end 89 of the rod 87 extends. On the cover 90 is mounted a switch casing 92 housing a switch having two normally spaced switch contacts (not shown) arranged in line with the rod 87, 89 and arranged to be moved to close a circuit, indicated by wires 93, 94, leading from the switch box, when the rod is moved axially outwardly. It will be seen that such axial movement of the rod 87 to close the switch is effected both when the inertia member overruns or lags behind the driving shaft 69 and axle. The deflection of either of the springs 75 or 76 causes the cam face thereon coacting with the conical cam face on the head 87 of the rod to move the rod axially outwardly to close the switch. A cover 94 bolted to the end plate 61 of the casing, houses the switch box 92 and carries an attachment plug socket similar to socket 45' of the preferred form. Access to the interior of the casing 57 may also be had through a top opening normally closed by a cover 57'.

From the foregoing, it will be seen that the inertia device of Figs. 8 to 11, inclusive, operates substantially like the inertia device of the preferred form to close a circuit upon abnormal acceleration or deceleration, and to hold it closed while such abnormal condition lasts.

In Fig. 12 is shown a diagram of an electropneumatic brake control system disclosed and claimed in applicant's copending divisional application, Serial No. 447,222 for "Control for vehicle brakes," filed June 16, 1942, which may be employed in conjunction with either of the inertia-responsive devices described, for controlling the brakes associated with a wheel and axle for preventing wheel slide. In this diagram, the inertia-responsive switch is designated by 95, the brake cylinder by 96, the operator-controlled pipe line for supplying fluid under pressure to the brake cylinder, by 97 and the automatically controlled valve device controlling the admission to and release of fluid from the brake cylinder by 98. The condition of this valve is controlled by the control circuit or circuits responsive to the inertia switch 95. The valve 98 may comprise three chambers 99, 100 and 101 separated by ported partitions 102, 103. A double-acting valve 104 is arranged in the chamber 100 and has a fluted stem 105 guiding it through the port in partition 102, the fluted stem being continued by a stem 106 of reduced section through an opening in the end wall of the valve casing, this outer projecting portion of the stem forming an armature operable by a magnet coil 107.

The valve is normally held in the position shown closing the port in the partition 103, which in turn leads to the exhaust port 108, and opening the port through the partition 102, by a spring 109 surrounding the valve stem and bearing at one end against a shoulder 110 on the stem and at the other end against the adjacent end wall of the valve casing. In this position communication is established between the operator-controlled supply pipe through the pipe 111 connecting the valve chamber 100 to the brake cylinder, to the brake cylinder. While the valve is in this position, the brake cylinder pressure is thus under the control of the operator and can be varied at will.

When the wheel braked by the pressure in the brake cylinder starts to slip the switch 95 is closed immediately; since the wheel starts to decelerate rapidly as soon as slipping is instigated. This closes a primary circuit from battery 112 or other source of energy, through lead 113, fuse 114, lead 115, magnet coil 116, lead 117, switch contacts of switch 95, lead 118, fuse 119, and lead 120 back to the other side of the battery. The closing of this circuit immediately causes the armature 121' of a closing switch in a relay circuit to be moved to the left, Fig. 12, closing the relay circuit for energizing the valve magnet 107 to operate the valve 104 to its other or lower position, in which it cuts off the supply of fluid pressure to the brake cylinder and opens the brake cylinder to exhaust. This relay circuit comprises battery 112, lead 113, fuse 114, lead 115, magnet coil 107, lead 121, switch point 122, bridging contact 123, switch point 124, lead 125, fuse 119, and lead 120 back to the other side of the battery. Suitable condensers as 145 and 146 may be connected across the switch terminals to minimize arcing.

As soon as the valve is operated to the lower position the pressure drops rapidly in the brake cylinder releasing the brakes and allowing the wheel to accelerate back to normal. To prevent opening of the relay circuit at the time when the wheel ceases to decelerate and again starts to accelerate, at which time the inertia-responsive switch 95 in the primary circuit is open, a time delay device is associated with the relay circuit to hold the switch 122, 123, 124 closed for a predetermined time period after the opening of the primary circuit. When the wheel has started to accelerate during slipping, the inertia member at a certain point in the acceleration lags behind the wheel and closes the primary circuit again through the inertia-controlled switch 95 and holds it closed until the wheel acceleration has again come back to normal rate corresponding to the deceleration rate of the train as a whole. Not until the relay circuit is allowed to be opened by the time delay device (which is again actuated to its starting position upon the second closure of the primary circuit and held in this position while the primary circuit is held closed, and is finally allowed to open the relay circuit only after the time for which it has been set has elapsed following the opening of the primary circuit as the wheel returns to its normal rate) is the valve returned to the position shown in Fig. 12 and the pressure again allowed to build up in the brake cylinder to apply the brakes.

In the diagram the time delay device is shown as comprising a dash-pot 126, the piston 127 and rod 128 of which is connected to the armature 121'. The piston 127 is provided with a one-way valve 129 permitting the fluid in the dash-pot to pass rapidly without hindrance from left to right of the piston when the coil 116 is energized, to substantially instantly close the switch 122, 123, 124. The switch member 123 has a lost motion connection with the piston rod 128 and is normally held against a shoulder 130 on the rod by a light spring 131. This lost motion is provided to allow the piston 127 of the dash-pot to move to the right the required distance before the shoulder 130 strikes the contact member 123 and opens the switch. The rate of return of the piston 127 to the right is controlled by a by-pass 132 the orifice 133 of which can be adjusted by an adjustable tapered plug 134.

While a specific dash-pot delay device has been described, it will be understood that other known types of delay action devices could be used. By setting the dash-pot device to delay the opening of the relay circuit for a period greater than the period during which the primary circuit is open when the wheel goes from deceleration to acceleration during slipping, which has been found to be a very short period, of the order of a fourth of a second, ample time is assured, before the full reapplication of the brakes, to allow the wheel to return to normal speed, and yet the time can be so controlled that substantially no braking efficiency is lost except that lost during the short time in which the wheel, while slipping, is decelerating and again accelerating back to normal, which has been found of the order of one second or even less. If, after reapplication of the brakes following wheel slipping, the track conditions should be such as to reduce rail adhesion, the wheel may again reach a slipping condition and in such event, the cycle to bring it back to normal before it actually slides on the track would be repeated. Of course, the operator could prevent such recurrence if he observed the track conditions and reduced the pressure in the control pipe 97.

What I claim is:

1. An inertia device for registering the rotative condition of a rotatable member, said device comprising a casing carried in axial alignment with said rotatable member, a rotary inertia registering element mounted in said casing, and driving connections between said rotatable member and said inertia element, said connections including a pair of generally parallel spaced leaf springs secured in balanced relation to an axial face of said inertia element, the free ends of said springs being biased to bear against fixed abutment means on said element, and a member driven by said rotatable member and mounted in a wall of the casing and having a driving means arranged to engage the springs adjacent their free ends, said connections permitting the rotary inertia element to shift rotatably relative to the rotatable member in response to a change in speed of the rotatable member.

2. An inertia device according to claim 1 in which additional abutment means is provided on the rotary inertia element to limit the deflection of the springs away from the fixed abutment means.

3. An inertia device according to claim 1 in which damping means is associated with the driving connections for damping the action of the springs on said inertia element.

4. An inertia device of the type for registering the rotative condition of a rotatable member, said device comprising a closed casing arranged to be supported in axial alignment with the rotatable member, a rotary inertia registering element mounted in substantially axial alignment with said member on the wall of said casing adjacent said member and driving connections between said member and element, including a leaf spring extending generally transaxially of an axial face of said rotary inertia element and rigidly secured thereto at one end and arranged to be engaged adjacent its free end by a means driven by said rotatable member, the spring permitting rotatable shifting of said element in response to change in speed of said rotatable member.

5. An inertia device of the type for registering the rotative condition of a rotatable member, said device comprising a closed casing arranged to be supported in axial alignment with the rotatable member, a rotary inertia registering element mounted in substantially axial alignment with said rotatable member and on the wall of said casing adjacent said member, a driving connection between said member and element, said connection comprising a pair of spaced leaf springs arranged on opposite sides of a diametrical plane of said element and fixedly secured at one of their ends to said element, and means driven by the rotatable member engaging said springs adjacent their free ends, an insulating member carrying spaced collector rings fixedly mounted in the casing and projecting between said springs substantially in axial alignment with said rotary inertia element, and bridging contacts carried by said springs in cooperative relation to said collector rings.

6. An inertia device for registering the rotative condition of a rotatable member, said device comprising a support, a rotary inertia registering element mounted on said support in substantially coaxial relation to said rotatable member, driving connections between said rotatable member and said inertia-element, said connections including a leaf spring means arranged substantially transaxially on one axial face of the inertia element and in balanced arrangement about its axis, a switch device controlled by said inertia element including a bridging contact carried by said spring means and opposed collector rings mounted on the support in coaxial relation to said element and adapted to be engaged by the bridging contact on said spring means upon deflection of said spring means due to excessive acceleration or deceleration of said rotatable member.

7. An inertia device for registering the rotative condition of a rotatable member said device comprising a support, a rotary inertia registering element mounted on said support in substantially coaxial relation to said rotatable member, driving connections between said rotatable member and inertia element including a pair of initially tensioned leaf springs arranged substantially diametrically on one axial face of said inertia element, and means for deflecting said springs from their normal position upon excessive acceleration or deceleration of said rotatable element, and means associated with the springs adjacent the axis of the rotary element operative to effect a signal upon such deflection from normal of either of said springs.

8. An inertia device for registering the rotative condition of a rotatable member comprising a rotary inertia element, an electric switch including a relatively stationary conductor ring, resilient driving means for rotating said inertia element from said rotatable member while permitting said inertia element to overrun said rotatable member, and a contact element adapted to be operated by said resilient means to electrically contact said conductor ring upon such overrun by said inertia member.

9. An inertia device for registering the rotative condition of a rotatable member, comprising an annular rotary inertia element coaxial with said rotatable member, an insulated stationary conductor ring coaxial with said rotatable member and said inertia element, resilient driving means for rotating said inertia element from said rotatable member whereby it may underrun and overrun said member including a transaxially extending transversely movable member having a contact element adapted to engage said conductor rings, and means operated by said rotatable member and engaging said transaxially extending member to drive said inertia element, said transaxially extending member being responsive to underrun and overrun of said inertia element to move said contact element into and out of engagement with said ring.

10. An inertia device for registering the rotative condition of a rotatable member, comprising a rotary inertia element, a flexible driving connection between said rotatable member and said element including a pair of spaced flexible spring members, each member being secured at one end to said inertia element and extending across the face thereof, spaced abutments on said inertia element adjacent the free ends of said spring members to limit the outwardly flexing movement of each member, each member being tensioned toward the associated abutment, means driven by said rotary member and adapted to flex one or the other of said spring members against the tension thereof to rotate said inertia element in one or the other direction, and control means operated by a predetermined degree of flexing movement of either of said spring members.

11. An inertia device for registering the rotative condition of a rotatable member, comprising an annular rotary inertia element, resilient means maintaining said element in a given rotative position relative to the rotatable member as long as the rotatable member rotates at a constant speed and adapted to yieldingly permit rotative movement of the inertia element relative to the rotatable member upon a change in speed of the rotatable member, a contact member supported for movement radially of said rotatable member in response to the rotative movement of the inertia element out of its normal position with respect to said rotatable member, and a non-rotative insulated conductor ring so located as to be engaged by said contact member upon radial movement thereof.

12. In an inertia device for registering the rotative condition of a rotatable member having a rotary inertia element adapted to overrun and underrun said rotatable member, the combination of an electric switch including conductor rings spaced axially of said rotatable member, a contact element adapted to contact said conductor rings, and a contact element support extending radially of said rotatable member and operated by the overrun or underrun of said inertia element to move said element into contact with said conductor rings.

13. In an inertia device for registering the rotative condition of a rotatable member having a rotary inertia element adapted to overrun and underrun said rotatable member, the combination of an electric switch including a pair of axially spaced, non-rotatable conductor rings mounted on a relatively stationary member, a contact element adapted to contact said conductor rings, and a contact element support extending radially of said rotatable member and operated by the overrun or underrun of said inertia element to move said element into and out of contact with said conductor rings.

14. An inertia device for registering the rotative condition of a rotatable member comprising a two-part closed casing adapted to be assembled as a unit to extend in axial alignment with said rotatable member, a rotary inertia registering element and a driving connection therefor from said rotatable member both carried in substantially their entirety by the wall of one part of said casing adjacent said rotatable member, said connection permitting the rotary inertia element to shift relatively to the rotatable member in response to a change of speed of said rotatable member, relatively movable switch parts mounted respectively on the rotary inertia element and on the wall of the other part of said casing opposite to the wall carrying said rotary inertia element, the operative engagement and disengagement of said switch parts by their relative movement being controlled by the relative rotatable shifting of said inertia element and said rotatable member.

15. An inertia device for registering the rotative condition of a rotatable member comprising a closed casing adapted to be assembled as a unit to extend in axial alignment with said rotatable member and including a section mounted adjacent to the rotatable member, movable switch parts movable radially of said rotatable member and a rotary inertia registering element both mounted in said casing section, a second casing section carrying relatively stationary switch parts for cooperation with said relatively movable switch parts and positioned so as to be located in operative association therewith upon securing said casing sections together, and means responsive to relative rotation between said rotatable member and said inertia element for actuating said relatively movable switch parts to engage said stationary switch parts.

16. An inertia device for registering the rotative condition of a rotatable member, comprising an annular rotary inertia element resiliently maintained in a given rotative position relative to the rotatable member as long as the rotatable member rotates at a constant speed and yieldingly permitted rotative movement relative to the rotatable member upon a change in speed of the rotatable member, a transaxially extending yielding member, a control element supported thereby for movement radially of said rotatable member in response to the rotative movement of the inertia element out of its normal position with respect to said rotatable member, and a second control element so located as to be rendered effective to exercise a control function by coaction with said movable control element upon radial movement thereof.

CAROLUS L. EKSERGIAN.